Oct. 21, 1947.  R. C. ZEIDLER  2,429,503
FLUID COUPLING
Filed Feb. 21, 1944  2 Sheets-Sheet 1
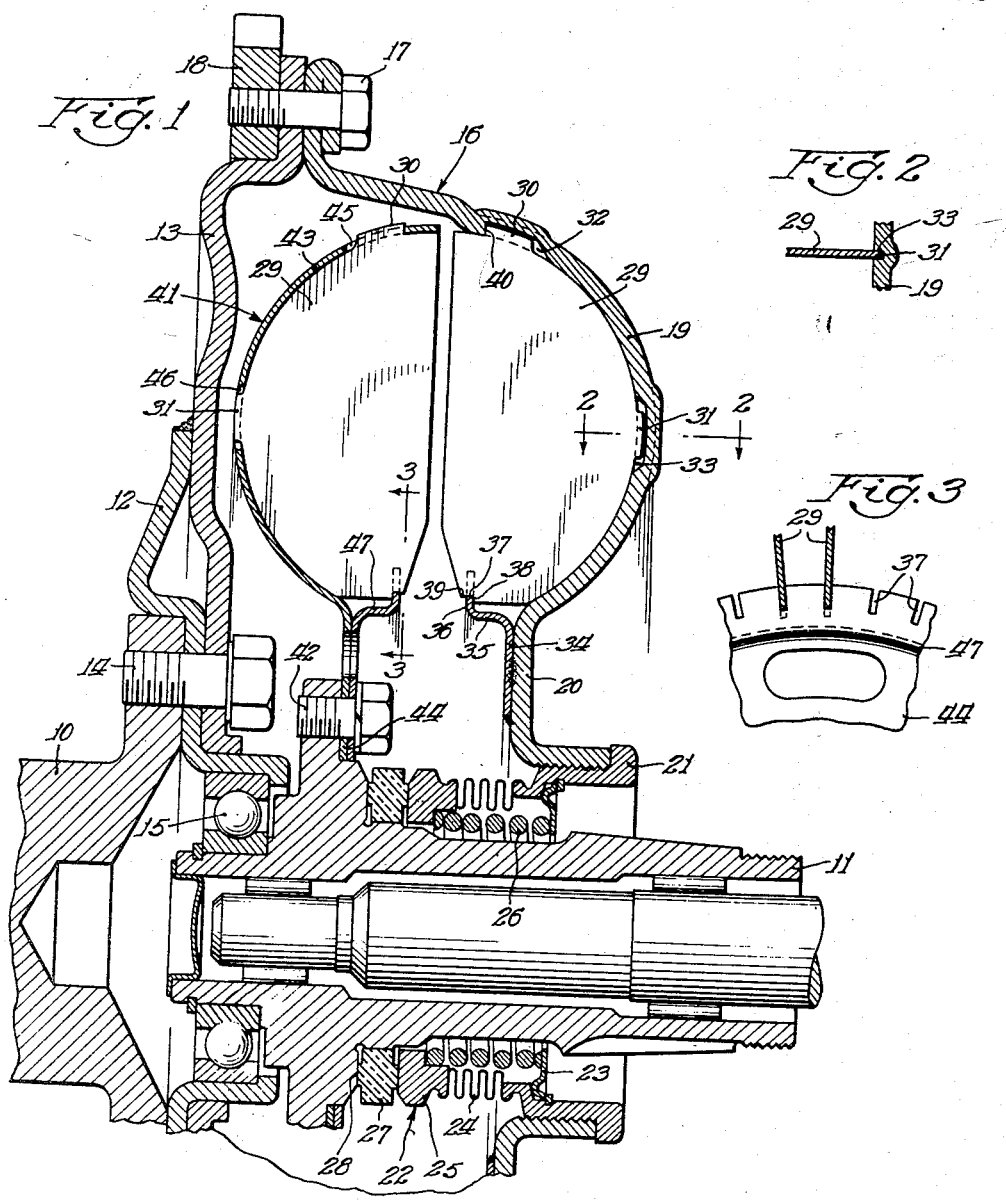
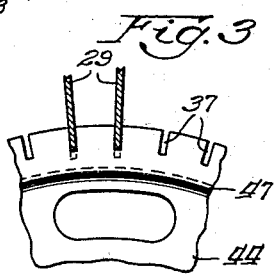
Inventor:
Reinhold C. Zeidler
By: Edward C. ...
Atty.

Oct. 21, 1947.    R. C. ZEIDLER    2,429,503
FLUID COUPLING
Filed Feb. 21, 1944    2 Sheets-Sheet 2
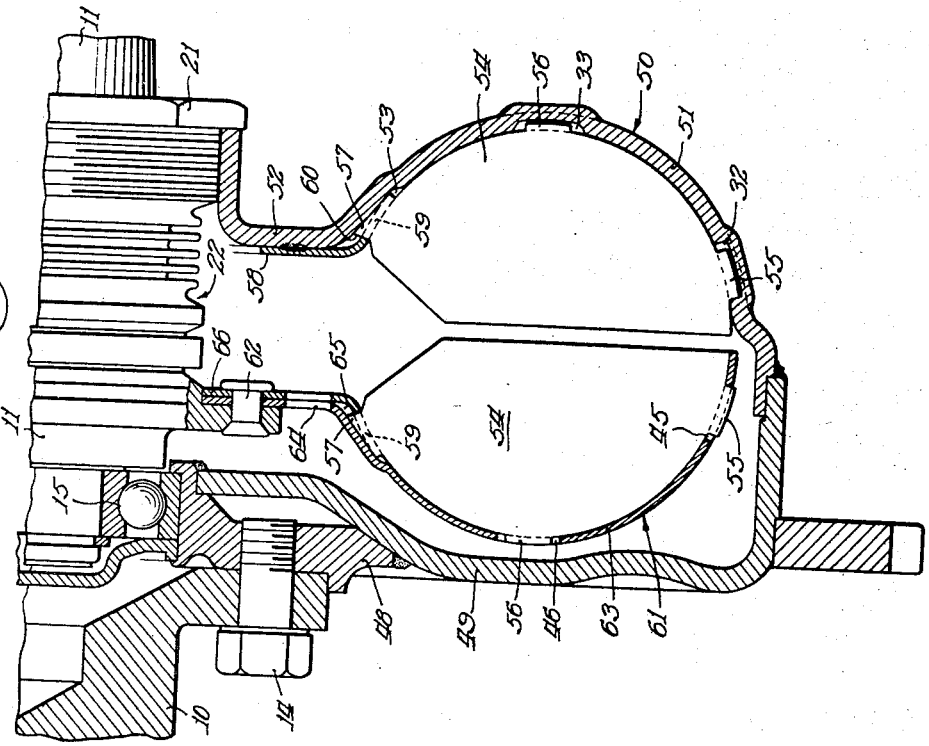
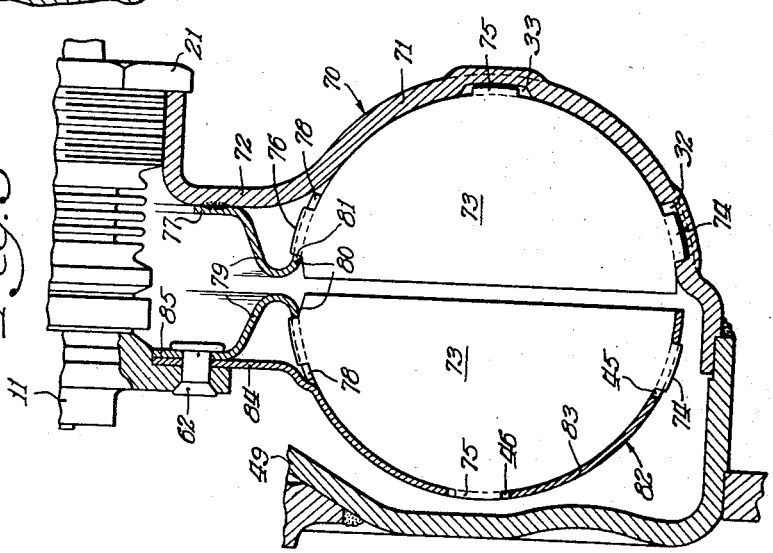
Inventor:
Reinhold C. Zeidler
By: Edward C. Fitzhugh
Atty.

Patented Oct. 21, 1947

2,429,503

UNITED STATES PATENT OFFICE 2,429,503

FLUID COUPLING

Reinhold C. Zeidler, Detroit, Mich., assignor to Borg-Warner Corporation, Chicago, Ill., a corporation of Illinois Application February 21, 1944, Serial No. 523,258

6 Claims. (Cl. 103—115)

1

My invention relates to hydrodynamic torque transmitting devices comprising vaned driving and driven elements, and more particularly my invention relates to improved constructions for fixing the vanes in the driving and driven elements of such devices.

Prior vaned hydrodynamic coupling devices have had the vanes fixed in the driving and driven elements in a number of ways, most of which required expensive equipment and considerable time for fixing the vanes in place. Perhaps the most common manner of fixing the vanes in the elements, however, was simply by spot-welding the vanes in the elements. Huge specially designed expensive automatic spot welding machines were required for this, if a minimum of labor was used.

It is an object of my invention to provide an improved construction for fixing vanes in the driving and driven elements of a hydrodynamic coupling device which holds the vanes in the elements without any welding of the individual vanes to the shell. It is contemplated that the vanes shall preferably be held in the elements with spring pressure so that when the coupling device is in use there is no rattling or vibration of the vanes in the elements. It is further contemplated that the improved construction shall effectively hold the vanes from sideward movement in the elements which might be caused by the force of fluid on the sides of the vanes.

My improved construction preferably comprises an annular member mounted on one edge of the hollow shell portion of a driving or driven element and bearing against the adjacent edges of vanes in the element for cooperating with tabs on opposite edges of the vanes, which fit in slots provided in the element, to hold the vanes in the element. It is another object of my invention to provide such an annular vane retaining member which extends radially inwardly of the coupling element to form a baffle for interrupting fluid circulation between the vanes and increasing the "slip" between the driving and driven elements of the coupling. It is a further object to provide another embodiment of the invention including such an annular vane retaining member which lies along and adjacent the surface of the fluid coupling element whereby the annular member allows free circulation of fluid between the vanes and causes substantially no interruption thereof. It is still a further object to provide another embodiment of the invention in which the annular vane retaining member is so formed to augment or complete the

2 curved inner surface of the driving or driven element along which the fluid flows between the vanes whereby the surface formed by the driving and driven element together with such an annular member on each of the elements is as complete a toroid as possible.

The invention consists of the novel constructions, arrangements and devices to be hereinafter described and claimed for carrying out the above stated objects and such other objects as will appear from the following description of certain preferred embodiments illustrated in the accompanying drawings, wherein:

Fig. 1 is a longitudinal sectional view of a fluid coupling embodying the principles of the invention;

Fig. 2 is a sectional view taken on line 2—2 of Fig. 1;

Fig. 3 is a sectional view taken on line 3—3 of Fig. 1;

Fig. 4 is a longitudinal sectional view of another embodiment of the invention; and Fig. 5 is a longitudinal sectional view of still another embodiment of the invention.

Referring now to Figs. 1, 2 and 3 of the drawings, the illustrated fluid coupling comprises a driving shaft 10 and a driven shaft 11. Annular members 12 and 13 are fixed to the shaft 10 by means of bolts 14, and the members 12 and 13 are also fixed together, independently of the bolts 14, by means of welding, as shown. The annular member 12 is formed to carry a ball bearing unit 15, and the driven shaft 11 is disposed in the unit 15, as shown, for effectively piloting the shaft 11 with respect to the shaft 10.

A fluid impeller or driving element 16 is fixed to the annular member 13 by means of bolts 17 passing through the member and element and into a ring gear 18, which is provided for well known purposes. The impeller element 16 comprises a hollow, substantially semi-toroidal shell portion 19 having substantially a semi-circular cross section and an annular hub portion 20 connected therewith. A member 21 of generally cylindrical shape is threaded into the impeller element 16, and a fluid seal 22 is provided between the member 21 and the shaft 11. The seal 22 is of well known construction and comprises a ring 23 fixed in the member 21, a flexible metal diaphragm 24 also fixed to the member 21 and connected with a ring-like member 25, a compression spring 26 acting between the members 23 and 25, and a ring-like member 27 of yielding material between the member 22 and a radially extending surface 28 formed on the driven shaft 11. It will be apparent that the shaft 10, the annular members 12 and 13, the impeller element 16 and the cylindrical member 21 form a housing adapted for holding fluid, and the seal 22 functions to complete the housing thus formed and make it fluid-tight.

Vanes 29 of substantially semi-circular shape are provided to fit in the semi-toroidal shell portion 19. Each of the vanes 29 is provided with tabs 30 and 31, and these tabs fit in slots 32 and 33 which are provided circumferentially spaced about the shell portion. It will be noted that the slots 32 are adjacent and spaced from the radially outer edge of the shell portion 19 and the slots 33 are substantially intermediate the inner and outer edges of the shell portion. An annular member 34 is welded to the hub portion 20, and this annular member comprises a portion 35 extending outwardly with respect to the hollow shell portion 19 and a portion 36 extending radially inwardly. The member 34 in its portion 36 is provided with a plurality of slots 37 each of which receives a vane 29, and the portion 36 at the bottom of each of the slots 37 fits in a notch in a vane formed by an edge 38 facing outwardly with respect to the hollow shell portion 19 and an edge 39 facing radially inwardly. The member 34 is so formed initially before being welded in place as shown that its portion 36 bears with spring pressure against both the edges 38 and 39 of the notch in as many of the vanes 29 as possible, depending on the uniformity with which the vanes can be manufactured, and preferably the member 34 bears with spring pressure against the edges 38 and 39 of all of the vanes 29. With each of the vanes so held, due to the pressure exerted by the member 34 on the vane, the edge 40 of the tab 30 on the vane bears against an edge of a slot 32. The annular member 34 thus functions to hold each of the vanes tightly in place in the hollow shell portion 19, and the slots 32 and 33 in the shell portion and the slots 37 in the annular member 34 function to hold the vanes 29 against sideward movement in the hollow shell portion as would be caused by fluid pressure on the vane sides. The portion 36 of the annular vane retaining member 34 extends radially outwardly to such an extent as to substantially impede the flow of fluid between the vanes 29, and the member 34 thus acts as a fluid baffle.

The runner or driven element 41 of the hydrodynamic coupling is disposed in the fluid container formed by the impeller element 16 and annular members 12 and 13 and is fixed by means of screws 42 to the driven shaft 11. The runner element 41 comprises a hollow, substantially semi-toroidal shell portion 43 which is substantially semi-circular in cross section and a hub portion 44 connected with the shell portion. The shell portion 43 is provided with circumferentially spaced slots 45 adjacent its radially outer edge and circumferentially spaced slots 46 intermediate its radially inner and outer edges. A plurality of vanes 29 identical with those in the impeller element 16 fit in the shell portion 43 with the tabs 30 and 31 of the vanes extending through the slots 45 and 46. A vane retainer element 47 is fixed with respect to the hub portion 44 by means of the screws 42 passing into the driven shaft 11. The annular member 47 has parts 35, 36 and 37 corresponding to the similarly numbered parts of the annular member 34, and the annular member 47 functions similarly to the member 34 to hold the vanes 29 in the runner element 41. The member 47 also acts as a baffle for impeding the flow of fluid between the vanes 29 in the runner 41, and the members 34 and 47 thus function to increase the "slip" or difference in speed between the impeller element 16 and runner element 41.

The embodiment of my invention illustrated in Fig. 4 is similar in many respects to that shown in Fig. 1, and like characters of reference in the two figures indicate like parts. The Fig. 4 embodiment differs principally from the Fig. 1 embodiment in that, in the Fig. 4 embodiment, vanes in impeller and runner elements are fixed in place by means of annular retainer members which extend along the sides of the semi-toroidal shell portions such that the annular members do not substantially interrupt circulation of the fluid between the vanes of the two elements. The structures for supporting the impellers from the input shafts also differ somewhat in the two embodiments. In the Fig. 4 embodiment, annular members 48 and 49 are fixed with respect to each other and to the shaft 10 by means of welding and by screws 14. The member 48 is formed to receive the bearing 15 as shown. The impeller element 50 in this embodiment comprises a hollow substantially semi-toroidal shell portion 51 and a hub portion 52 connected therewith. The impeller element 50 is welded to the annular member 49 to fix the element 50 with respect to the driving shaft 10. Slots 32 and 33 are provided in the shell portion 51, and a recessed zone 53 is provided in addition in the shell portion 51. Vanes 54 having tabs 55, 56 and 57 fit in the shell portion 51, and the tabs are disposed respectively in the slots 32 and 33 and in zone 53. An annular member 58 is welded to the hub portion 52, and the member 58 extends from the hub portion into the shell portion 51 and into the recessed zone 53 as shown. The member 58 is provided with slots 59 which receive the tabs 57 of the vanes 54, and the bottoms of the slots 59 abut and bear against the edges 60 of the tabs 57 which face outwardly with respect to the hollow shell portion 51. The annular member 58 in receiving the tabs 57 in its slots and in bearing against the tabs functions similarly to the member 34 in the Fig. 1 embodiment to hold the vanes 54 tightly in the impeller element 50 and against sideward movement as would be caused by fluid pressure on the sides of the vanes. The annular member 58, however, in lying along the inner surface of the impeller element 50 and in the zone 53, unlike the member 34, functions to permit the fluid to flow past it without substantially impeding its flow.

The runner 61 of the coupling illustrated in Fig. 4 is fixed to the shaft 11 by means of rivets 62 and comprises a semi-toroidal shell portion 63 and a hub portion 64. The shell portion 63 is provided with the slots 45 and 46 and also with a recessed zone 65 corresponding to the zone 53 in the impeller 50. A plurality of vanes 54 fit in the shell portion 63 with the tabs 55, 56 and 57 fitting in the slots 45 and 46 and in the zone 65, and an annular member 66 is fixed with respect to the hub portion 64 and extends into the shell portion 63 and into the zone 65. The annular member 66 is provided with slots 59 similar to those in the annular member 58, and the member 66 abuts and bears against the outwardly facing edges 60 of the tabs 57 of those vanes in the runner element 61 to hold the vanes in the runner element in the same manner as the vanes 54 in the impeller element 50 are held in that element by the member 58.

The embodiment of the invention illustrated in Fig. 5 is quite similar in many respects to those shown in Figs. 1 and 4, and like characters of reference in Figs. 1, 4 and 5 designate like parts. The Fig. 5 embodiment differs principally from the other embodiments in that annular vane fixing members are provided for the impeller and rotor which do not impede the flow of fluid between the vanes and which extend toward each other and are formed to augment the toroidal fluid surface of the driving and driven elements. The Fig. 5 embodiment comprises an impeller 70 welded to an annular member 49 and having a cylindrical member 21 screw-threaded into the impeller. The impeller 70 comprises a hollow substantially semi-toroidal shell portion 71 which is substantially semi-circular in cross section and a hub portion 72 connected therewith. The hollow shell portion 71 is provided with the slots 32 and 33, and a plurality of vanes 73 having tabs 74 and 75 fit in the shell portion 71 with the tabs 74 and 75 being disposed respectively in the slots 32 and 33. The vanes 73 are each also provided with a tab 76 adjacent the radially inward edge of the shell portion 71, and an annular member 77 having slots 78 therein for receiving the tabs 76 is fixed to the hub portion 72. The member 77 is provided with a portion 79 extending outwardly with respect to the hollow shell portion 71 and with a portion 80 extending inwardly with respect to the hollow shell portion 71. The portion 80 is provided with the slots 78, and this portion is so disposed as to augment or complete the semi-toroidal fluid surface in the shell portion 71, as may be observed from the drawings. The portion 80 at the bottoms of the slots 78 abuts and bears with spring pressure against the edges 81 of the tabs 76 which face outwardly with respect to the hollow shell portion 71, and the vanes 73 are thus held tightly in the shell portion and against any sideward movement in substantially the same manner as are the vanes 29 in the Fig. 1 embodiment of the invention.

The runner or driven element 82 of the fluid coupling illustrated in Fig. 5 is fixed to the driven shaft 11 by means of rivets 62. The runner element comprises a hollow substantially semi-toroidal shell portion 83 which is semi-circular in cross section and a hub portion 84 connected therewith. The shell portion 83 is provided with the slots 45 and 46, and vanes 73 provided with the tabs 74 and 75 fit in the hollow shell portion 83 with the tabs extending through the slots 45 and 46. An annular member 85 is fixed with respect to the hub portion 84 by means of the rivets 62, and the annular member 85 is provided with the portions 79 and 80 and the slots 78, which are similar to the corresponding parts of the annular member 77. The slots 78 in the member 85 receive the tabs 76 of the vanes 73 in the shell portion 83, and the member 85 abuts and bears against these tabs to hold these vanes tightly in the shell portion 83 in the same manner as the member 77 cooperates with the tabs 76 of the vanes in the shell portion 71. The portion 80 of the annular member 85 also augments the inner semi-toroidal fluid surface of the shell portion 83 as shown. It will be observed that the two hub portions 72 and 84 of the driving and driven elements are spaced, and the portions 80 of the two annular members 77 and 85 tend to complete the toroidal surface formed by the two shell portions 71 and 83 to bridge this space and decrease the distance the fluid must jump at the inside of the toroid formed by the shell portions.

The vanes in my improved hydrodynamic coupling construction are tightly held in place by spring pressure in the respective shell portions and they are held against sideward movement which would be caused by the pressure of fluid on the sides of the vanes. The annular vane retaining members in the Fig. 1 embodiment extend into the passage between the driving and driven members that the fluid would normally take and the members interrupt the circulation of fluid to form baffles for increasing the "slip" of the coupling. The vane retaining members in the Fig. 4 embodiment extend adjacent the sides of the semi-toroidal shell portions and do not interrupt the circulation of fluid between the driving and driven elements in order to provide a coupling having little "slip." The vane retaining members in the Fig. 5 embodiment of the invention extend toward each other from the spaced hub portions of the driving and driven elements and then away from each other for completing the toroidal surface formed by the driving and driven elements and for decreasing the distance the fluid must bridge while unsupported.

It will be apparent to those skilled in the art that changes may be made without departing from the principles of the invention. For example, each of the vane retaining members 34, 47, 58, 66, 77 and 85 may be fastened with respect to the associated impeller or runner element not only in the manner shown but may be so fastened in other suitable manners including bolting, riveting or welding. Although I have illustrated the vanes and impeller and runner element shells in each of the embodiments of the invention as being semi-circular, it will be apparent that these members may be of any other semi-toroidal shape such as semi-oblong shape. It will be apparent also that the vanes in the impeller and runner element shells may extend not only radially, but they may be bent or slanted from radial direction, as desired. It will be understood further that although no inner core ring is illustrated herein, such a ring may be provided in accordance with prior well known practice. I wish it therefore to be understood that my invention is not to be limited to the specific constructions and arrangements shown and described, except only insofar as the claims may be so limited. In the construction of the appended claims, I wish it to be understood that a slot specified to be in a shell shall include not only an opening extending completely through the shell but shall include also a notch which does not extend completely through the shell.

I claim:

1. A fluid coupling element comprising a hollow, substantially semi-toroidal shell portion, said shell portion being provided with circumferentially spaced slots adjacent and spaced from an edge thereof, a plurality of vanes radially disposed and fitting in said shell portion, each of said vanes being provided with a tab fitting in one of said slots, and an annular member fixed to said shell portion adjacent an opposite edge thereof and having a slot for receiving each of said vanes for cooperating with said tabs to hold the vanes from sideward movement in the shell portion, said annular member abutting an edge of each of said vanes facing outwardly of said hollow shell portion and also abutting a radial edge of said vanes and exerting spring pressure both radially and circumferentially on said vanes whereby at least one tab on each vane is forced against the end of its respective slot and said vane is spring pressed against the inner surface of the shell, the said annular member and said tabs cooperating to hold the vanes from movement out of the shell portion.

2. A fluid coupling element comprising a hollow shell portion which is substantially semi-toroidal and has a substantially semi-circular cross section, said shell portion being provided with circumferentially spaced slots adjacent and spaced from an edge of the shell portion, a plurality of substantially semi-circular vanes radially disposed and fitting in said shell portion and each provided with a tab fitting in one of said slots, and an annular member fixed with respect to said shell portion at its opposite edge and having a slot for receiving each of said vanes for cooperating with said tabs to hold the vanes from sideward movement in the shell portion, said annular member abutting two edges of each of said vanes and exerting spring pressure urging said vanes in a radially outward direction and in a direction forcing the tabs to bear against one end of their respective slots, said annular member thus cooperating with the tabs on the vanes for holding the vanes in the shell portion.

3. A fluid coupling element comprising a hollow shell portion which is substantially semi-toroidal and has a substantially semi-circular cross section, said shell portion being provided with circumferentially spaced slots adjacent and spaced from the radially outer edge of the shell portion, a plurality of substantially semi-circular vanes radially disposed and fitting in the said shell portion and each provided with a tab fitting in one of said slots, and an annular member fixed with respect to said shell portion at its radially inner edge and having a slot for receiving each of said vanes for cooperating with said tabs to hold the vanes from sideward movement in the shell portion, said annular member abutting an edge of each of said vanes facing outwardly of the hollow shell portion adjacent the radially inner edge of the shell portion and said annular member likewise bearing against the radially inner edge of said vane with a spring pressure, said annular member thus exerting pressure radially outward as well as in a direction forcing the vane inwardly of the said shell portion, and thus cooperating with the tabs on the vanes for holding the vanes in the shell portion.

4. A fluid coupling element comprising a hollow shell portion which is substantially semi-toroidal and has a substantially semi-circular cross section, said shell portion being provided with circumferentially spaced slots adjacent and spaced from an edge of the shell portion, a plurality of substantially semi-circular vanes radially disposed and fitting in said shell portion and each provided with a tab fitting in one of said slots, and an annular member fixed with respect to said shell portion at its opposite edge and having a slot for receiving each of said vanes for cooperating with said tabs to hold the vanes from sideward movement in the shell portion, said annular member abutting and bearing with spring pressure against an edge of each of said vanes facing outwardly of the hollow shell portion and likewise bearing with spring pressure against the inner radial edge of said vanes and adjacent said last named edge of the shell portion for cooperating with the tabs on the vanes for holding the vanes from movement out of the shell portion and tightly in contact with the shell portion.

5. In a device of the class described including means forming an annular fluid container with an annular member forming one portion of the container and a hollow substantially toroidal shell portion attached to said annular member and forming another portion of said container, those improvements which comprise circumferentially spaced slots located in the hollow substantially toroidal shell portion, and passing only part way through the wall thereof, a plurality of substantially semi-circular vanes radially disposed and fitting in said hollow substantially toroidal shell portion, each of said vanes provided with tab means fitting in at least one of said slots, and means comprising an annular member fixed with respect to said shell portion at its radially inner edge and exerting pressure on said vane means urging said vane means radially outwardly and urging said tab means into engagement with the ends of said slot means, thus cooperating with said slots and tab means retaining said vaned elements in said toroidal shell portion.

6. A fluid coupling element comprising a substantially semi-toroidal shell portion, said shell portion being provided with circumferentially spaced slots adjacent and spaced from an edge of said shell portion, a plurality of substantially semi-circular radially disposed vanes fitting in said shell portion and provided with tab means fitting in said slots, and means bearing against said vaned portions and exerting pressure holding said vanes against said shell portion and also forcing said tabs against one end of said slot means.

REINHOLD C. ZEIDLER.

REFERENCES CITED

The following references are of record in the file of this patent:

UNITED STATES PATENTS

| Number | Name | Date |
| --- | --- | --- |
| 2,328,393 | Neracher et al. | Aug. 31, 1943 |
| 2,115,895 | Weihmann | May 3, 1938 |
| 2,357,295 | Thompson | Sept. 5, 1944 |
| 2,304,721 | Werther | Dec. 8, 1942 |
| 2,301,645 | Sinclair | Nov. 10, 1942 |
| 2,311,958 | Neracher | Feb. 23, 1943 |